May 17, 1927.

E. F. HALLIDAY 1,628,971

HAY BUNCHING RAKE

Filed May 19, 1925

Inventor

E. F. Halliday

By Clarence O'Brien

Attorney

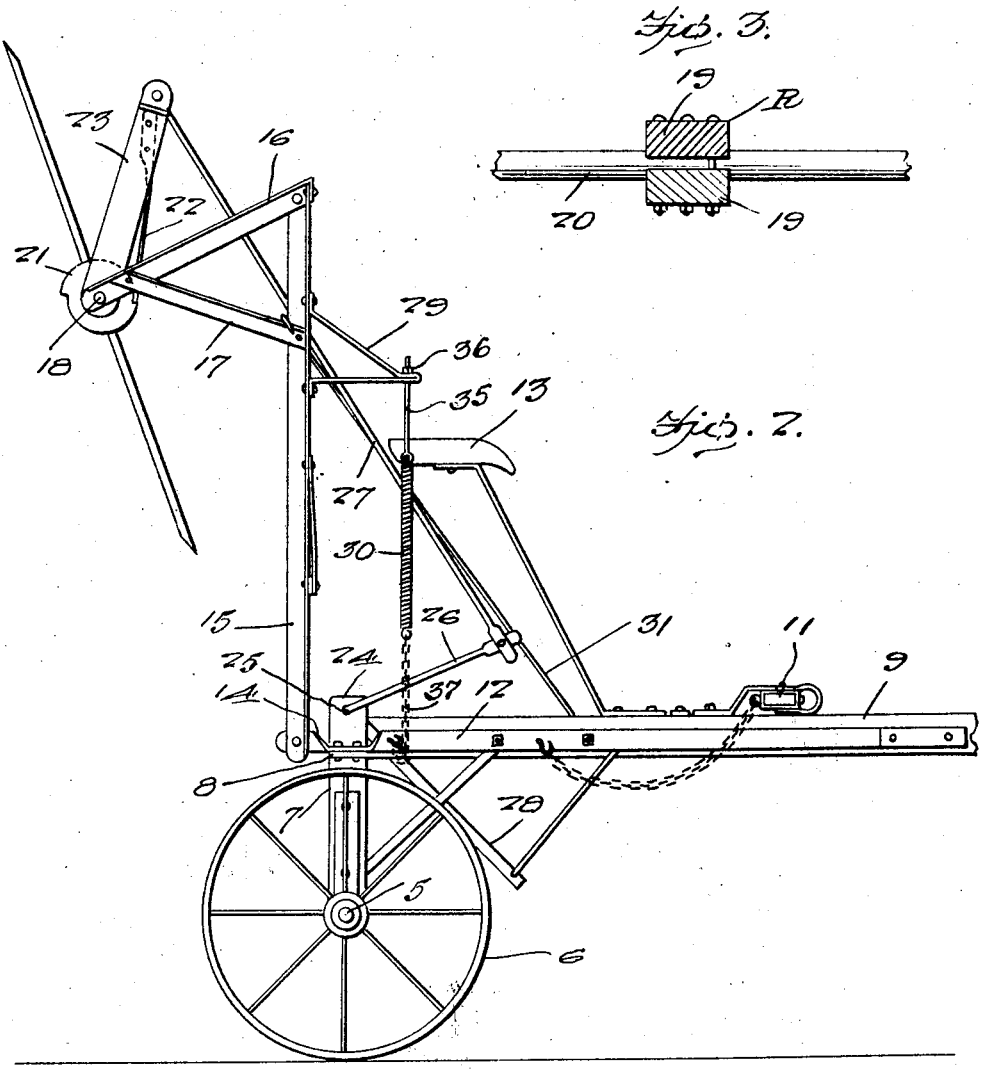

Patented May 17, 1927.

1,628,971

UNITED STATES PATENT OFFICE.

ERNEST F. HALLIDAY, OF BISHOP, CALIFORNIA.

HAY-BUNCHING RAKE.

Application filed May 19, 1925. Serial No. 31,387.

The present invention relates to a hay bunching rake and aims to provide a device for efficiently taking the hay from the windrows which have been formed and placing it in bunches.

An important object of the invention is to leave the hay in more compact bunches than the work is done with laborers using pitch forks, so as to prevent the hay from being blown away, very readily.

Another important object of the invention is to provide a device of this nature which is exceedingly simple in construction, easy to operate, strong, durable, not likely to easily become out of order, reliable in its operation, and otherwise well adapted for the purpose for which it is designed.

With the above and numerous other objects in view, as will appear as the description proceeds, the invention resides in certain novel features of construction, and in the combination and arrangement of parts as will be hereinafter more fully described and claimed.

In the drawing:

Figure 2 is a side elevation of the machine, showing the rake proper in a raised position, and Figure 3 is an enlarged detail sectional view, taken substantially on the line 3—3 of Figure 1.

Figure 1:
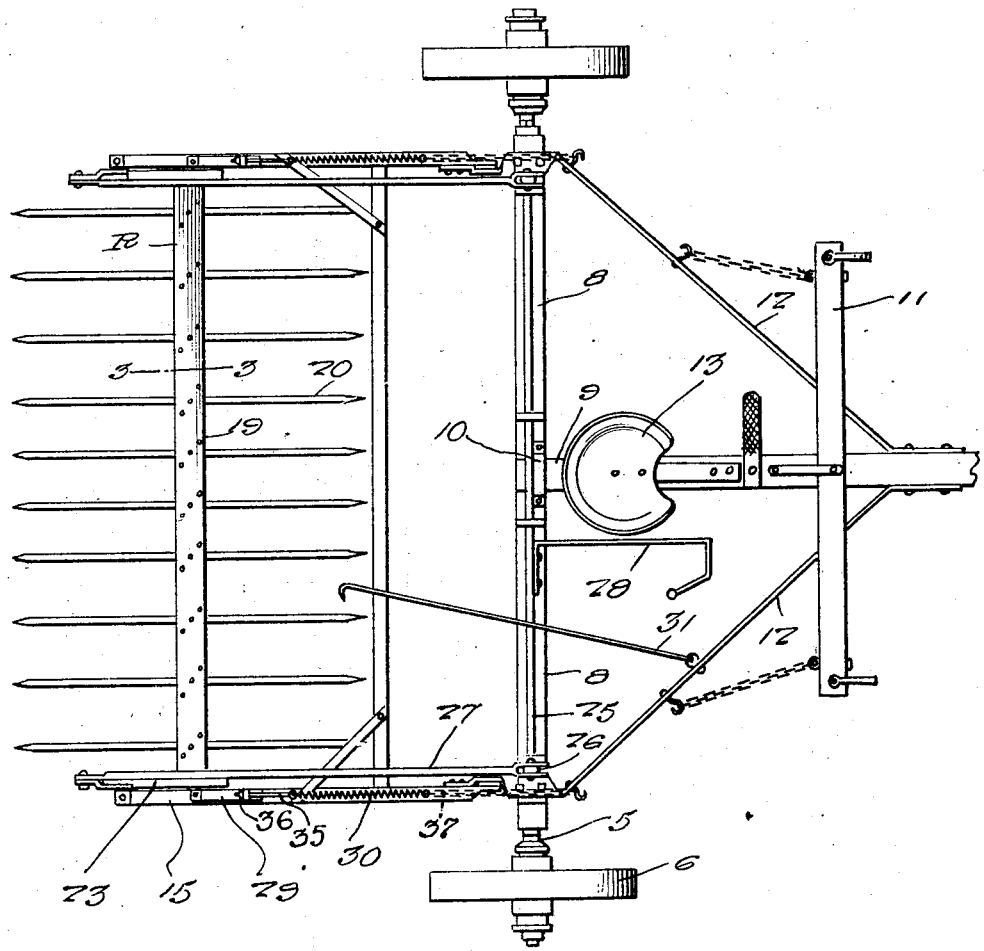
Figure 1 is a top plan view of the machine embodying my invention, showing the rake proper in a lowered position.

Referring to the drawing in detail, it will be seen that the wheeled supporting frame of the machine includes an axle bar 5 having wheels 6 journaled on its ends and supporting uprights 7 adjacent its ends which are bridged by the cross beam 8. A tongue 9 is attached to the intermediate portion of the beam 8 as at 10, and extends forwardly, having mounted thereon, in any suitable manner, a double tree 11 or any other draft attaching device. Brace rods 12 are attached to the cross beam 7, adjacent its ends and converge forwardly and have their front extremities attached to an intermediate portion of the tongue 9. A driver's seat 13 is mounted on the tongue 7.

A pair of plates 14 are attached to the ends of the cross beam 8, one adjacent each end thereof, and are preferably in the form of integral extensions from the braces 12. Bars 15 are pivoted to the plates 14 and swing in vertical planes. Legs 16 are angularly disposed on the extremities of the bars 15 and are braced by members 17. A rake indicated generally by the letter R is journaled between the extremities of the legs 16 by means of the pintles 18 piercing these legs. The rake R includes a pair of bars 19, having a plurality of spaced parallel tines extending therebetween as is shown to advantage in Figure 3. Ratchet members 21 are rotatable with the rake R and engageable by springs 22 extending from the arms 23 which are pivoted on the pintles 18. A pair of standards 24 rise from the beam 8 and have journaled therein a shaft 25 having end cranks 26. Rods 27 connect the extremities of the cranks 26 with the extremities of the arms 23. A foot operated lever 28 is fixed to an intermediate portion of the shaft 25 and terminates so that a person sitting on the seat 13 may easily operate said lever.

Brackets 29 are fixed to the bars 15 and springs 30 are attached to the brackets 29 by rods 35 piercing openings in the brackets and having nuts 36 engaged therewith, and to the braces 12 by chains 37 and are tensioned for holding the bars 15 in a substantially vertical position, that is, raised, as is shown in Figure 2, in which position a hooked rod 31 may be engaged with one of the bars 15 at the juncture thereof with the respective brace 17, said rod 31 being pivoted on one of the braces 12. As shown in Figure 1, the springs 30 will be under tension and will prevent the rake from dragging too heavily on the ground.

In the operation of the device, the rake is lowered as shown in Figure 1, and the operator will exert a light pressure on the foot lever 28 as the machine is being pulled along. The hay is taken from the windrow and when a sufficient amount thereof has been collected, more pressure will be exerted on the foot lever 28, thereby swinging the arms 23 through the intermediary of the shaft 25, crank 26, and rods 27. The swinging of the arms 23 will cause the springs 22 which are engaged with the ratchets 21 to rotate the rake and dump the bunch at the desired point, and the rake will flap over and be again ready for another similar operation. It will be seen that the entire rake structure may be easily raised and hooked by the rod 31, when the machine is travelling along and not in actual use.

It is thought that the construction, operation and advantages of the invention will now be clearly understood, without a more detailed description thereof. The present embodiment of the invention has been disclosed merely by way of example, and it is apparent that numerous changes in the details of construction, and in the combination and arrangement of parts may be resorted to, without departing from the spirit or scope of the invention as hereinafter claimed or sacrificing any of its advantages.

Having thus described my invention, what I claim as new is:

In combination, a wheeled supporting structure, a frame pivotally mounted on the supporting structure, a rake rotatably mounted in the frame, means for rotating the rake when desired, a pair of brackets projecting from the frame, rods piercing openings provided in said brackets, nuts on the ends of said rods, springs engaged on the ends of said rods, chains engaged on the ends of said springs and engaged with the wheeled supporting structure, said springs being tensioned to urge said frame to a raised position.

In testimony whereof I affix my signature.

ERNEST F. HALLIDAY.